April 27, 1948.  P. ORR  2,440,613
TRANSMISSION
Filed Oct. 27, 1945  2 Sheets-Sheet 2
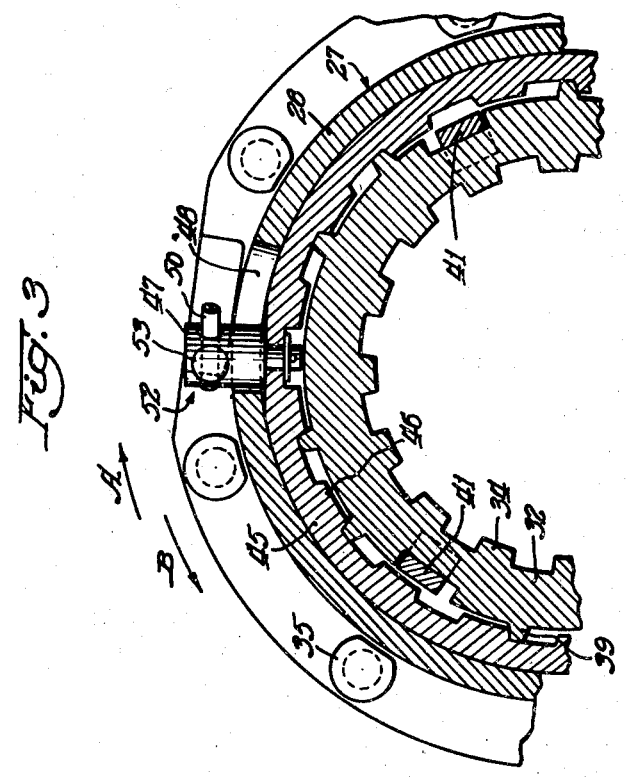
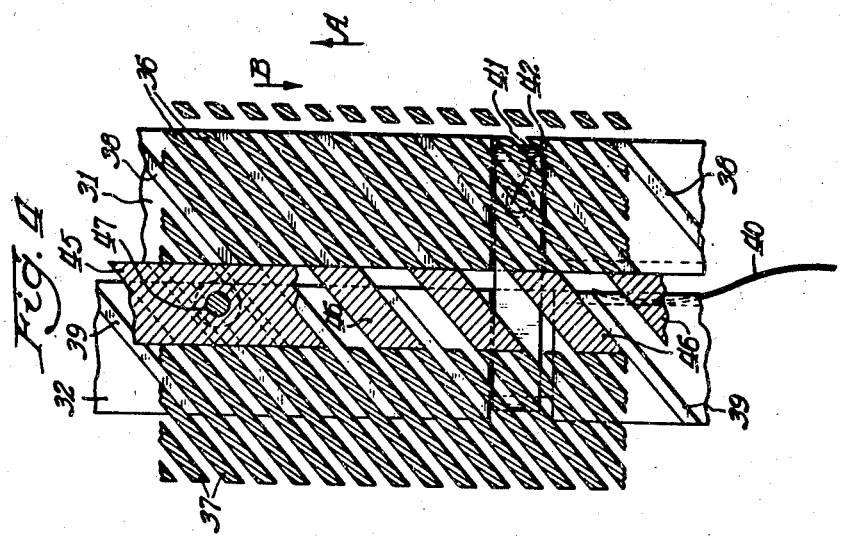
Inventor:
Palmer Orr
By Edward C. Birtzbaugh
Atty.

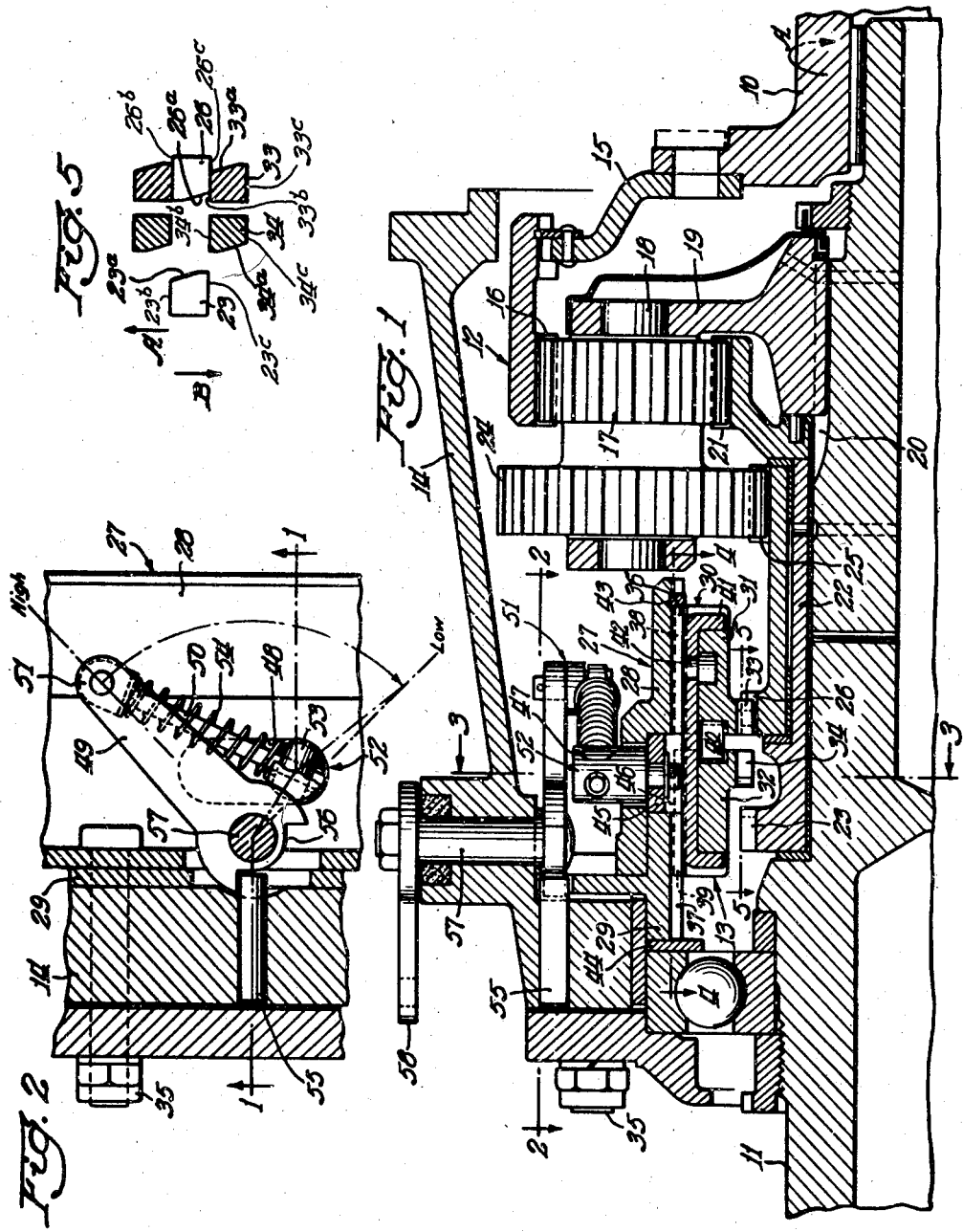

Patented Apr. 27, 1948

2,440,613

UNITED STATES PATENT OFFICE 2,440,613

TRANSMISSION

Palmer Orr, Muncie, Ind., assignor to Borg-Warner Corporation, Chicago, Ill., a corporation of Illinois Application October 27, 1945, Serial No. 624,983

16 Claims. (Cl. 74—275)

My invention relates to transmissions and more particularly to coupling mechanisms in transmissions.

In airplane transmissions providing a plurality of speed ratios between a motor shaft and a propeller shaft, it is very desirable that the propeller shaft should never be entirely free of the motor shaft. The propeller provides a flywheel effect for the engine and when the engine is idling, this effect is necessary in connection with the engine so that the engine does not stall. The stalling of an airplane engine when the airplane is aloft, as when a shift in speed ratio is being made in the transmission, can be very disastrous, as is well understood.

It is an object of my invention to provide an improved transmission particularly suitable for use in airplanes which does not allow a complete disconnection between the engine and propeller when a change in speed ratio is being made. To this end, it is an object of the invention to provide an airplane transmission having an improved coupling device therein which is adapted to complete both a low and a high speed ratio through the transmission but which does not allow the speed ratio of the driving and driven shafts of the transmission to vary outside of the range between the low and high speed ratios provided by the transmission when a change in speed ratio is being made through the transmission.

More particularly it is an object to provide an improved coupling device for use in an airplane transmission which comprises a set of coupling teeth of the Maybach type on two different members of the transmission each of which is engageable by a set of Maybach coupling teeth provided on one of a pair of coupling elements carried by another member of a transmission for coupling either of the first two mentioned members to the last mentioned member to complete either of two different ratios through the transmission. It is an object to so arrange the Maybach teeth that the coupling elements have no neutral position with respect to the teeth first mentioned but may ratchet on the teeth when the speed ratio is being changed through the transmission and is between the low and high speed ratios of the transmission.

Still more particularly it is an object of the invention to provide such a coupling device in which the coupling elements are shiftable according to the torque between the member by which they are carried and either of the other two members, the torque being transmitted through the coupling teeth for shifting the coupling elements into and out of their engaged positions. It is contemplated that the latter two members shall preferably be reaction members of the gearing which when held stationary complete the low and high speed ratios through the transmission and that the member carrying the coupling elements shall be stationary for braking either of the reaction members.

The invention consists of the novel constructions, arrangements and devices to be hereinafter described and claimed for carrying out the above stated objects and such other objects as will appear from the following description of a certain preferred embodiment illustrated in the accompanying drawings, wherein:

Fig. 1 is a longitudinal sectional view of a transmission embodying the principles of the invention and taken along line 1—1 of Fig. 2;

Fig. 2 is a sectional view taken on line 2—2 of Fig. 1;

Fig. 3 is a sectional view taken on line 3—3 of Fig. 1;

Fig. 4 is a developed sectional view taken on line 4—4 of Fig. 1; and

Fig. 5 is a sectional view taken on line 5—5 of Fig. 1.

Like characters of reference designate like parts in the several views.

My invention is described particularly with reference to a transmission for airplanes which is shown in the accompanying drawings. The illustrated transmission comprises a drive shaft 10 which may be connected directly to the engine or other source of power (not shown), a driven shaft 11 adapted to be connected to a propeller (not shown), a double reduction planetary gear set 12 adapted to provide a reduced drive between drive shaft 10 and driven shaft 11 and a coupling device 13 for effecting the changes in ratio through gear set 12. The entire mechanism is enclosed in a housing 14 which may be mounted between the propeller and engine.

The gearing comprises a drive plate 15 secured to the drive shaft 10 and driving a ring gear 16. The ring gear 16 meshes with and drives one or more planet pinion gears 17 which are the smaller of pairs of gears formed integrally as a spool and mounted to rotate about pinion shafts 18. A carrier 19 supports pinion shafts 18 and is mounted on and drives through splines 20 in driven shaft 11. The planet pinions 17 mesh with a sun gear 21 drivingly associated with a sleeve 22 at an end of the latter. The sleeve 22 is rotatably mounted on the driven shaft 11 and is formed with teeth 23 at its opposite end as shown so that the sleeve may function as a reaction member, as will be described.

The larger of the pairs of pinion gears is shown at 24, and the larger pinion gears mesh with a sun gear 25. The sun gear 25 has a sleeved extension which is rotatably supported on the sleeve 22 and is formed with teeth 26 as shown, so that the sun gear also may function as a reaction member as will be described.

The coupling 13 comprises a stationary member 27 which is made up of two portions 28 and 29. A coupling element 30 which comprises two portions or toothed elements 31 and 32 and which is helically splined to the stationary member 27 is disposed between the member 27 and the reaction members 22 and 25 of the gear set 12. The portions 31 and 32 of the coupling element are provided with teeth 33 and 34 respectively, and the coupling element 30 is shiftable so that the teeth 33 may mesh with the teeth 26 of the reaction member 25 and the teeth 34 may mesh with the teeth 23 of the reaction member 22. The coupling element 30 when meshing with the teeth 26 functions to hold the reaction member 25 stationary, and the gear set 12 is of such construction that a high speed drive, which is, however, of less than one to one ratio, is provided from the shaft 10 to the shaft 11. The coupling element 30 when engaging with the teeth 23 functions to hold the reaction member 22 stationary, and the gear set 12 under this condition provides a low speed ratio from the drive shaft 10 to the driven shaft 11.

The portions 28 and 29 of the stationary member 27 may be fixed with respect to the housing 14 by any suitable means, as by means of bolts 35. The portion 28 is provided with helical splines 36 and the portion 29 is provided with helical splines 37 (see Fig. 4). As will be noted from the drawings, the splines 36 and 37 extend in the same direction and in effect form continuations of each other, so that the portions 28 and 29 function as a single member.

The coupling element portions 21 and 32 are provided with helical splines 38 and 39 respectively, and as will be noted, these splines extend in the same direction and interengage with the splines 36 and 37 of the portions 28 and 29. The coupling element portions 31 and 32 are movable toward each other, and a spring 40 is disposed between them for yieldingly maintaining the portions apart. A plurality of retainer yokes 41 are disposed about the outer periphery of the coupling portions 31 and 32 in appropriate slots provided in the portions, and these yokes function to limit the movement of the portions away from each other so that the teeth 34 and 33 carried by the portions cannot be simultaneously in interengagement with both sets of teeth 26 and 23. The yokes 41 are preferably fixed with respect to one of the portions 31 as by means of pins 42. The coupling element 30 moves longitudinally of the transmission, as will be hereinafter described, with the splines 38 and 39 moving between the splines 36 and 37, and an abutment ring 43 is provided at one end of the stationary member 27 and an abutment ring 44 is provided at the other end of the member 27 for limiting movement of the coupling element 30 in both directions.

Referring to Fig. 5, it will be observed that the teeth 26 have beveled ends 26a; the teeth 23 have beveled ends 23a; the teeth 33 have beveled ends 33a; and the teeth 34 have beveled ends 34a. The beveled ends of these teeth cooperate with the spring 40 moving the coupling element portions 31 and 32 apart to assure that the coupling 13 is never in a complete neutral condition and that similarly the transmission is never in a complete neutral condition, all as will be hereinafter fully described. The teeth 23 have opposite faces 23b and 23c and the teeth 26 have opposite faces 26b and 26c which are parallel to the axis of rotation of the sleeves 22 and 25 carrying these teeth. The teeth 33 and 34 are provided with corresponding faces 33b, 33c, 34b and 34c extending in the same direction, as are shown. When the teeth 26 and 33 are in mesh, the faces 26b, 26c, 33b and 33c engage, and due to the direction in which these teeth extend, there can be no relative rotation between the element 31 and the sun gear 25. There can similarly be no relative rotation between the element 32 and the sun gear sleeve 22 when the teeth 23 and 34 are in engagement. These teeth with their opposite faces parallel to the axis of rotation of the sleeves 22 and 25 and with their beveled ends are commonly known as "Maybach" coupling teeth.

A blocker 45 is provided for blocking movement of the coupling element portions 31 and 32. The blocker is in the form of an annular ring disposed in a suitable groove within the stationary member 27 and between its portions 28 and 29, as shown. The blocker 45 is provided with helical splines 46 on its inner periphery, and these splines are less in width than the distance between adjacent splines 38 or adjacent splines 39, as is apparent from Figs. 3 and 4. The blocker 45 thus may have limited oscillatable movement with respect to the coupling element portions 31 and 32.

A shifting mechanism is provided for the blocker 45, and this mechanism comprises a stud 47 swiveled and connected to the blocker 45 and extending outwardly thereof through a suitable slot 48 provided in the stationary portion 28. The stud 47 is connected with a rock arm 49 by means of a shift rod 50. The rod 50 at one end has a pivotal connection 51 with the rock arm 49, and the rod 50 at its other end has a universal connection 52 with the stud 47. The connection 52 may be of any suitable type, such as one utilizing a round bar 53 rotatably disposed in a suitable cavity within the stud and through which the rod 50 extends and is slidably disposed. A spring 54 is disposed about the rod 50 and functions to yieldingly maintain the rod at an outer limit of its movement with respect to the universal connection 52. The movement of the rock arm 49 is limited by means of a pin 55 fixed within the housing 14 and extending into a suitable slot 56 of the rock arm. The rock arm 49 is connected by means of a shaft 57 with a shift lever 58 on the outside of the housing 14 which is utilized for conditioning the transmission for either its high or its low ratio, as will be described.

The operation of the transmission including its coupling 13 is as follows: The drive shaft 10 is driven by the attached motor (not shown) in a clockwise direction as viewed from the motor end of the transmission or as seen in Fig. 3 and as is designated by the arrows A in Figs. 1 and 3. With the condition of the coupling 13 as shown, in which the teeth 33 of the coupling element 30 are in engagement with the teeth 26 of the reaction member 25 of the gearing, the high speed power train is completed through the transmission. The reaction on the coupling element 30 is through the teeth 26 and 33 when the motor is driving and is in a counterclockwise direction as viewed from the motor end of the unit, that is, in the direction indicated by the arrows B in the drawings. Such a reaction on the coupling element 30 and particularly on its portion 31 tends to move the element 30 toward the front end of the transmission or toward the left as seen in Fig. 1 with the splines 38 of the portion 31 sliding between the splines 36 of the stationary member 27. Such movement of the coupling element 30, is, however, prevented by the blocker 45, when the blocker is in its high speed position in which it is shown in the drawings. In this position of the blocker, its splines 46 are in the way of the splines 38 so that the portion 31 cannot move forwardly of the transmission. When the throttle of the driving motor is closed, the reaction on the coupling element 30 is in the opposite direction, that is, in a clockwise direction indicated by the arrows A, and the coupling element portion 31 tends to move rearwardly of the transmission. This movement is, however, prevented by the ring 43. When the blocker 45 is in its illustrated position, the teeth 26 and 33 thus remain engaged regardless of whether the motor is driving or a coast condition exists, and the transmission is locked in high speed ratio.

When it is desired to shift the transmission into its low speed ratio, the shift lever 58 is actuated to move rock arm 49 into its low speed position as is indicated in Fig. 2. Such movement of the rock arm 49 compresses the spring 54, and the link 50 travels through its universal connection 52 with the stud 47. The blocker 45 and its stud remain in their positions in which they are shown, since the reaction with the motor driving remains the same on the coupling element portion 31, and the splines 38 of the portion thrust against the splines 46 of the blocker and prevent movement of the blocker. After such movement of the shift lever 58, the operator momentarily closes the throttle to reduce the torque on the drive shaft 10, and this reduction of torque releases the thrust of the splines 38 on the blocker splines 46 and allows the spring 54 to move the blocker in a clockwise direction, as indicated by the arrows A in the drawings. The blocker splines 46 thus move against the splines 39 of the coupling element portion 32, which are in the annular groove provided in the stationary member 27 for the blocker, and unblock the splines 38 of the coupling element portion 31. Thereafter, on an opening of the throttle which increases the torque applied to the shaft 10, the reaction on the portion 31 in the counterclockwise direction indicated by the arrows B causes the portion 31 to move forwardly of the transmission, with the splines 38 passing between the splines 36 of the stationary member 27. The teeth 33 thus move out of mesh with the teeth 26 to thereby break the high speed power train through the transmission.

While the high speed power train is completed through the transmission and until the speed of the shaft 10 has been raised sufficiently after the breakage of the high speed power train by disengagement of the teeth 33 and 26, the reaction member 22 and its teeth 23 rotate in the clockwise direction as indicated by the arrows A in the drawings. When the teeth 33 move out of mesh with the teeth 26, the teeth 34 move into contact with the teeth 23; however, due to the beveled tooth sides 23a and 34a of the teeth 23 and 34, the teeth 34 ratchet over and do not interengage with the teeth 23. In this condition of the coupling 13, the spring 40 is flexed, and neither the low nor the high speed power train is completed through the transmission. When the speed of the drive shaft is increased sufficiently so that the shafts 10 and 11 are rotating in substantially the low speed ratio with respect to each other, the reaction member 22 and its teeth 23 cease to rotate in the clockwise direction indicated by the arrows A and begin to rotate in the opposite direction indicated by the arrows B. On such reversal of direction of rotation, the teeth 34 cease ratcheting over the teeth 23 and slide into interengagement with the latter teeth. The low speed power train is thus completed through the transmission. When there is a drive in low speed ratio through the transmission, the reaction on the coupling element portion 32 is in the counterclockwise direction indicated by the arrows B, and the splines 39 of the portion move through the splines 37 of the stationary member 27 to the limits of their movement forwardly of the transmission against the abutment plate 44.

With the transmission being in low speed ratio, when the splines 39 move to the forward limits of their movement against the abutment plate 44, the blocker 45 moves clockwise slightly as indicated by the arrows A until the blocker splines 46 contact the splines 38 of the coupling element portion 31 which now are in the annular blocker groove in the stationary member 27, and the blocker blocks movement of the splines 39 and of the portion 32 rearwardly of the transmission. The blocker 45 thus locks the transmission in low speed ratio.

When it is desired to shift from low speed ratio to high speed ratio, the shift lever 58 is moved accordingly to bring the rock arm 49 into its position as shown in Fig. 2. Such movement of the lever 58, by means of the rock arm 49, the spring 54 and the rod 50, functions to oscillate the blocker 45 in a counterclockwise direction indicated by the arrows B to bring the splines 46 of the blocker into contact with the opposite sides of the splines 38 of the coupling element portion 31 which extend into the annular groove provided for the blocker. The splines 39 of the coupling element portion 32 are thus unblocked, and immediately upon a closure of the throttle for the engine to decrease the torque impressed on the drive shaft 10, the coupling element portion 32 moves to the rear of the transmission with its splines 39 sliding between the splines 37, due to the reaction on the reaction member 22 changing to the clockwise direction indicated by arrows A, to disengage the teeth 34 with the teeth 23. The low speed ratio power train through the transmission is thus broken.

While the low speed ratio is completed through the transmission and until the drive shaft 10 has decreased in speed to bring the ratio of the shafts 10 and 11 to the high speed ratio as determined by the gear set 12, the reaction member 25 and its teeth 26 are rotating in the counterclockwise direction as indicated by the arrows B. The chamfered ends of the teeth 33a and 26a are effective when this condition exists to maintain the teeth 33 and 26 disengaged and to limit the rearward movement of the coupling element portion 31; however, when the speed of the shaft 10 decreases sufficiently so that the high speed ratio exists between the shafts 10 and 11, the reaction member 25 and its teeth 26 stop and begin to rotate in the opposite direction, that is, in the clockwise direction indicated by the arrows A due to a reversal in torque. On such rotation, the teeth 33 move into interengagement with the teeth 26 to complete the high speed ratio through the transmission. With the throttle remaining closed, the reaction on the portion 31 remains in the clockwise direction so that the splines 38 are effective to move the coupling element portion 31 to engage with the abutment ring 43. When the splines 38 and the coupling element portion 31 thus move to their rearward limit of movement, the blocker element 45 under the action of the spring 54 oscillates slightly in the counterclockwise direction indicated by arrows B so that its splines 46 move against the splines 39 and the blocker is in its original position in which it is shown in Fig. 4 to thereafter block movement of the coupling element portion 31 forwardly of the transmission. The throttle may thereafter be opened for driving the shaft 11 through the gearing 12 from the shaft 10. The thrust is then again on the splines 46, and a driving connection in high speed ratio is complete through the transmission.

The teeth 26, 33, 34, and 23 are beveled, as shown particularly in Fig. 5, to facilitate the shifting of the coupling mechanism and to assure that the transmission can never be in a complete neutral condition. The arrangement of the yokes 41, the coupling element portions 31 and 32 and the teeth 23 and 26 is such that either one or both of the sets of teeth 33 and 34 at all times contact with either one or both of the sets of teeth 23 and 26. When the coupling element 30 is in the exact center of its shifting movement, the beveled ends 33a and 34a are both in contact with the beveled ends 23a and 26a of the teeth 23 and 26, and the spring 40 maintains the teeth in ratcheting engagement. When the shafts 10 and 11 are rotating at a ratio in between the high and low speed ratios provided by the gearing 12, both sets of teeth 33 and 34 will ratchet on the sets of teeth 23 and 26. The speed of the shaft 11, however, cannot exceed its speed that would be provided by the high speed ratio of the gearing without a reversal in the direction of rotation of the reaction member 25 and engagement of the teeth 33 and 26, and the speed of the shaft 11 cannot decrease below the speed that would be provided by the gearing 12 in low speed ratio without a reversal in the direction of rotation of the reaction member 22 and engagement of the teeth 34 and 23. It will thus be apparent that, with this arrangement, the propeller and its shaft 11 is never at any time free of the shaft 10 and an engine connected therewith.

I wish it to be understood that my invention is not to be limited to the specific constructions and arrangements shown and described except only insofar as the claims may be so limited, as it will be apparent to those skilled in the art that changes may be made without departing from the principles of the invention.

I claim:

1. In a coupling device, the combination of two relatively rotatable members, a set of teeth on each of said members, a pair of coupling elements having teeth thereon, the teeth on said coupling elements being adapted to interengage with the teeth of said rotatable members whereby each coupling element may be coupled with one of said rotatable members, at least some of said teeth being beveled whereby the teeth on said coupling elements may ratchet on the teeth of said rotatable members, springs means acting on said coupling elements whereby one or the other of said coupling elements must always be in engaged or in ratcheting position with respect to the teeth adapted to be engaged thereby on said relatively rotatable members, and means for causing relative shifting of said coupling elements and said rotatable members to cause engagement or disengagement of the elements and members in response to the transmission of torque between said elements and members.

2. In a coupling device, the combination of two coaxially disposed relatively rotatable members, a set of teeth on each of said members, a pair of coupling elements coaxially disposed with respect to said members and each having a set of teeth thereon, the teeth on each of said coupling elements being adapted to interengage with the teeth on one of said rotatable members, at least one set of each pair of sets of teeth adapted to interengage being beveled whereby one of the sets of teeth may ratchet on the other, spring means connecting said coupling elements whereby one or the other of the sets of teeth on said coupling elements must always be in engaged or in ratcheting position with respect to the teeth adapted to be engaged thereby on said relatively rotatable members, and means for causing relative shifting of said coupling elements and said rotatable members to cause engagement or disengagement of the elements and members in response to the transmission of torque between said elements and members.

3. In a coupling device, the combination of two coaxially disposed relatively rotatable members, a set of teeth on each of said members, a pair of coupling elements between and coaxially disposed with said members and each having a set of teeth thereon, the teeth on each of said coupling elements being adapted to interengage with the teeth on one of said rotatable members, the teeth on said elements and on said members being beveled whereby the teeth on each of the elements may ratchet on the teeth adapted to be interengaged thereby, spring means disposed between said coupling elements whereby one or the other of the sets of teeth on the coupling elements must always be in engaged or in ratcheting position with respect to the teeth adapted to be engaged thereby on said relatively rotatable members, means for limiting the movement of said coupling elements apart whereby the elements cannot simultaneously be in engagement with the sets of teeth on both said members simultaneously, and means for causing relative shifting of said coupling elements and said rotatable members to cause engagement or disengagement of the elements and members in response to the transmission of torque between said elements and members.

4. In a coupling device, the combination of two coaxial relatively rotatable members, a set of teeth on each of said members, a pair of coupling elements having teeth thereon, the teeth on said coupling elements being adapted to interengage with the teeth of said rotatable members whereby each coupling element may be coupled with one of said rotatable members, each of said teeth having two opposite faces parallel to the axis of rotation of said relatively rotatable members whereby a coupling element and rotatable member when engaged may have no relative rotation therebetween, at least some of said teeth being beveled on their ends whereby the teeth on said coupling elements may ratchet on the teeth of said rotatable members, spring means connecting said coupling elements whereby one or the other of said coupling elements must always be in engaged or in ratcheting position with respect to the teeth adapted to be engaged thereby on said relatively rotatable members, and means for causing relative shifting of said coupling elements and said rotatable members to cause engagement or disengagement of the elements and members in response to the transmission of torque between said elements and members.

5. In a coupling device, the combination of two coaxially disposed relatively rotatable members, a set of teeth on each of said members, a pair of coupling elements between and coaxially disposed with said members and each having a set of teeth thereon, the teeth of each of said elements being adapted to interengage with the teeth of one of said rotatable members, each of said teeth having two opposite faces parallel to the axis of rotation of said rotatable members whereby the teeth on an element and on a member when interengaged allow no relative rotation between the element and member coupled thereby, the teeth on said elements and on said members being beveled on their ends whereby the teeth on said coupling elements may ratchet on the teeth of said rotatable members, spring means disposed between said coupling elements whereby one or the other of the sets of teeth on the coupling elements must always be in engaged or in ratcheting position with respect to the teeth adapted to be engaged thereby on said relatively rotatable members, means for limiting the movement of said elements apart whereby the teeth on both of said elements cannot simultaneously be engaged with the teeth on said members, and means for causing relative shifting of said coupling elements and said rotatable members to cause engagement or disengagement of the elements and members in response to the transmission of torque between said elements and members.

6. In a coupling device, the combination of first, second and third relatively rotatable members and means for coupling the first of said members to either said second or third member, said means including teeth provided on said second and third members, a pair of coupling elements having teeth thereon and coupled with said first member, means permitting movement of said coupling elements relative to each other and to said second and third members whereby each of said coupling elements is adapted to interengage with one of said second and third members, at least some of said teeth being beveled whereby the teeth on said coupling elements may ratchet on the teeth of said second and third members, spring means connecting said coupling elements whereby one or the other of said coupling elements must always be in engaged or in ratcheting position with respect to the teeth adapted to be engaged thereby on said second or third members, and means for causing relative shifting of said coupling elements and said second and third members to cause engagement or disengagement thereof in response to the transmission of torque therebetween.

7. In a coupling device, the combination of first, second and third coaxially disposed relatively rotatable members and means for coupling the first of said members to either said second or third member, said means including teeth provided on said second and third members, a pair of coupling elements each having a set of teeth thereon and coupled with said first member, means permitting movement of said coupling elements relative to each other and to said second and third members, the teeth on each of said coupling elements being adapted to interengage with the teeth on one of said second and third members, at least one set of each pair of sets of teeth adapted to interengage being beveled whereby one of the sets of teeth may ratchet on the other, spring means connecting said coupling elements whereby one or the other of the sets of teeth on said coupling elements must always be in engaged or in ratcheting position with respect to the teeth adapted to be engaged thereby on said second or third member, and means for causing relative shifting of said coupling elements and said second and third members to cause engagement or disengagement thereof in response to the transmission of torque therebetween.

8. In a coupling device, the combination of first, second and third coaxially disposed relatively rotatable members and means for coupling the first of the said members to either said second or third member, said means including teeth provided on second and third members, a pair of coupling elements each having a set of teeth thereon, said coupling elements having splines connecting them to said first member whereby the elements may move relative to each other and to said second and third members, said coupling elements being disposed between the teeth on said second and third members and the teeth on each said element being adapted to interengage with the teeth on one of said second and third members, the teeth on said coupling elements and on said second and third members each having opposite faces parallel to the axis of rotation of said members whereby there can be no relative rotation between the parts coupled by said teeth and the teeth being beveled on their ends whereby the teeth on said coupling elements may ratchet with respect to the teeth on the second and third members adapted to interengage therewith, spring means disposed between said coupling elements whereby one or the other of the sets of teeth on the coupling elements must always be in engaged or in ratcheting position with respect to the teeth adapted to be engaged thereby on said second and third members, and means limiting the movement of said coupling elements apart whereby the coupling elements may not be in engagement with said second and third members simultaneously, said splines being spiral for causing relative shifting of said coupling elements and said second and third members to cause engagement or disengagement thereof in response to the transmission of torque therebetween.

9. In a coupling device, the combination of a first stationary member and second and third coaxially disposed rotatable members, and means for coupling either said second and third member to said stationary member, said means including teeth provided on said second and third members, a pair of coupling elements disposed between said second and third members and each having a set of teeth thereon, said coupling elements having splines connecting them to said first member whereby to be movable with respect to each other and to said second and third members, the teeth on each of said coupling elements being adapted to interengage with the teeth on one of said second or third members, said teeth each having a pair of opposite faces parallel to the axis of rotation of said second and third members whereby the teeth when interengaged permit no relative rotation between the parts coupled thereby and being beveled on their ends whereby the teeth on said coupling elements may ratchet on the teeth of said second or third members, spring means disposed between said coupling elements whereby one or the other of the sets of teeth on the coupling elements must always be in engaged or in ratcheting position with respect to the teeth adapted to be engaged thereby on said second and third members, and means limiting the movement of said coupling elements apart whereby both of the elements cannot be engaged with one of said second or third members simultaneously, said splines being spiral for causing relative shifting of said coupling elements and said second and third members to cause engagement or disengagement thereof in response to the transmission of torque therebetween.

10. In transmission mechanism, in combination with a drive shaft, a driven shaft, means including gearing for providing power trains of two different speed ratios between said shafts, said means also including a first member, and second and third relatively rotatable members which are so arranged that one of said power trains is completed when said second member is coupled to said first member and the other power train is completed when said third member is coupled to said first member, the improvement comprising means for so coupling said members and including teeth provided on said second and third members, a pair of shiftable coupling elements each having a set of teeth thereon and coupled with said first member, said coupling elements being movable relative to each other and being shiftable relative to said second and third members, said members and said coupling elements being coaxially disposed with respect to each other and the sets of teeth of said coupling elements being adapted to be disposed between the teeth of said second and third members during a speed change, the teeth on each of said coupling elements being adapted to interengage with the teeth on one of said second and third members, said teeth being beveled on their engaging ends, whereby the teeth of said coupling elements may ratchet on the teeth of said second and third members, spring means disposed between said coupling elements yieldably urging said coupling elements apart, said coupling elements being arranged so that one or the other of the sets of teeth on the coupling elements must always be in engaged or in ratcheting position with respect to the teeth adapted to be engaged thereby on said second or third members, means limiting the movement of said coupling elements apart whereby the coupling elements cannot be simultaneously in coupling engagement with said second and third members, and means responsive to a reversal in torque in said gearing power trains for causing shifting of said coupling elements relative to said second and third members through the reaction of said gearing on the one of said second and third members which is then coupled with one of said coupling elements.

11. In transmission mechanism, in combination with a drive shaft, a driven shaft, means including gearing for providing power trains of two different speed ratios between said shafts, said means also including a first member, and second and third coaxially disposed relatively rotatable members which are so arranged that one of said power trains is completed when said second member is coupled to said first member and the other power train is completed when said third member is coupled to said first member, the improvement comprising means for so coupling said members and including teeth provided on said second and third members, a pair of shiftable coupling elements between and coaxially disposed with said members, said coupling elements each having a set of teeth thereon and having splines connecting them to said first member whereby said coupling elements are each adapted to interengage with the teeth on one of said second and third members, each of said teeth having a pair of opposite faces parallel to the axis of rotation of said second and third members, whereby the teeth when interengaged allow no relative rotation between the coupling element and member coupled by the interengaged teeth, said teeth being beveled on their engaging ends, whereby the teeth of a coupling member may ratchet on the teeth adapted to be engaged thereby, spring means disposed between said coupling elements yieldably urging said coupling elements apart, said coupling elements being arranged so that one or the other of the sets of teeth on the coupling elements must always be in engaged or in ratcheting position with respect to the teeth adapted to be engaged thereby on said second or third members, and means limiting the movement of said coupling elements apart so that the teeth thereon cannot simultaneously be in interengagement with the teeth on said second and third members, said splines being spiral for causing shifting of said coupling elements relative to said second and third members upon reversal of torque in said gearing power trains and through the reaction of said gearing on the one of said second and third members which is then coupled with one of said coupling elements.

12. In transmission mechanism, in combination with a drive shaft, a driven shaft, means including gearing for providing power trains of two different speed ratios between said shafts, said means also including a first member, and second and third relatively rotatable members which are so arranged that one of said power trains is completed when said second member is coupled to said first member and the other power train is completed when said third member is coupled to said first member, the improvement comprising means for so coupling said members and including teeth provided on said second and third members, a pair of shiftable coupling elements each having a set of teeth thereon and adapted to interengage with the teeth on one of said second or third members, coupling means coupling said coupling elements with said first member arranged to allow movement of the coupling elements relative to each other and shifting thereof relative to said second and third members, said coupling means being responsive to the force produced by a reversal of the torque in said gearing between said first member and either said second or third members and transmitted through said teeth for shifting the coupling elements to engage or disengage the teeth thereof with the teeth of said second or third members through the reaction of said gearing during torque reversal on the one of said second and third members which is then coupled with one of said coupling elements, at least one set of each pair of sets of teeth adapted to interengage being beveled on their engaging ends, whereby one of the said sets of teeth may ratchet on the other, and spring means yieldably opposing movement of said coupling elements relative to each other, said coupling elements being arranged so that one or the other of the sets of teeth on said coupling elements must always be in engaged or in ratcheting position with respect to the teeth adapted to be engaged thereby on said second or third members.

13. In transmission mechanism, in combination with a drive shaft, a driven shaft, means including gearing for providing power trains of two different speed ratios between said shafts, said means also including a first member, and second and third coaxially disposed relatively rotatable members which are so arranged that one of said power trains is completed when said second member is coupled to said first member and the other power train is completed when said third member is coupled to said first member, the improvement comprising means for so coupling said members and including axially spaced sets of teeth provided on said second and third members, a pair of shiftable coupling elements each having a set of teeth thereon adapted to be disposed between the teeth of said second and third members during a speed change, the teeth on each of said coupling elements being adapted to interengage with the teeth on one of said second and third members, said coupling elements being spirally splined to said first member, whereby force produced by torque reversal in said gearing between said first member and either said second or third members and transmitted through said teeth functions to shift the coupling elements into and out of engagement with the teeth on said second or third members through the reaction of said gearing during torque reversal on the one of said second and third members which is then coupled with one of said coupling elements, each of said teeth having opposite faces parallel to the axis of rotation of said rotatable members, whereby the teeth when interengaged function to allow no relative rotation between the coupling elements and the second or third members coupled by the interengaging teeth, said teeth on their engaging ends being beveled whereby each of said coupling elements may ratchet with respect to the second or third member adapted to be interengaged thereby, spring means disposed between said coupling elements urging said coupling elements apart, said coupling elements being arranged so that one or the other of the sets of teeth on the coupling elements must always be in engaged or in ratcheting position with respect to the teeth adapted to be engaged thereby on said second or third members, and means limiting the movement of said coupling elements apart, whereby the coupling elements cannot simultaneously be in coupling engagement with said second and third members.

14. In transmission mechanism, the combination of a drive shaft, a driven shaft, means including a planetary gearing and a torque responsive braking means for providing power trains of two different speed ratios between said shafts, said means also including a first member, and second and third members, said first member being stationary and constituting an element of said torque responsive braking means and the gearing being so arranged that one of said power trains is completed when said second member is coupled to said first member for braking the second member and the other power train is completed when said third member is coupled to said first member for braking the third member, and means for so coupling the members through the reaction of said planetary gearing during torque reversal on the one of said second and third members which is then coupled with one of said coupling elements and including teeth provided on said second and third members, a pair of shiftable coupling elements each having a set of teeth thereon adapted to be disposed between the teeth on said second and third members during a speed change, coupling means coupling said coupling elements with said stationary member arranged to allow movement of said coupling elements relative to each other and shifting thereof relative to said second and third members, whereby the teeth on each of said coupling elements may interengage with the teeth on one of said second and third members, said teeth being beveled on their engaging ends, whereby said coupling elements may ratchet on said second and third members, spring means disposed between said coupling elements yieldably opposing movement of said coupling elements relative to each other, said coupling elements being arranged so that one or the other of the sets of teeth on the coupling elements must always be in engaged or in ratcheting position with respect to the teeth adapted to be engaged thereby on said second or third members, said coupling means being operable upon a reversal of torque in said planetary gearing and through the reaction of said planetary gearing during torque reversal on the one of said second and third members which is then coupled with one of said coupling elements to effect shifting of said coupling elements to engage the other of said coupling elements with the other of said members.

15. In transmission mechanism, the combination of a drive shaft, a driven shaft, means including planetary gearing and a torque responsive braking means for providing power trains of two different speed ratios between said shafts, said means also including a first member, and second and third coaxially disposed members, said first member being stationary and constituting an element of said torque responsive braking means, and said second and third members being rotatable, said gearing being so arranged that one of said power trains is completed when said second member is coupled to said first member to be braked thereby and the other power train is completed when said third member is coupled to said first member to be braked thereby, means for so coupling said members and including axially spaced sets of teeth carried by said second and third members, a pair of shiftable coupling elements coaxial with said members and each having a set of teeth thereon adapted to be disposed between the teeth carried by said second and third members during a speed change and being adapted to interengage with the teeth on one of said second and third members, said coupling elements being spirally splined to said first member, whereby the force produced by reversal of torque in said gearing torque between said first member and either said second or third member and transmitted through said teeth causes a shifting movement of the coupling element to engage or disengage said teeth through the reaction of said planetary gearing during torque reversal on the one of said second and third members which is then coupled with one of said coupling elements, said teeth each having opposite faces parallel to the axis of rotation of the rotatable members, whereby the teeth when interengaged allow no relative rotation between the coupling element and the member coupled by the interengaged teeth, said teeth being beveled on their engaging ends, whereby the teeth of the coupling elements may ratchet over the teeth of said second or third members, and spring means disposed between said coupling elements yieldably opposing movement of said coupling elements toward each other, said coupling elements being arranged so that one or the other of the sets of teeth on the coupling elements must always be in engaging or in ratcheting position with respect to the teeth adapted to be engaged thereby on said second or third members.

16. In transmission mechanism, the combination of a drive shaft, a driven shaft, means including planetary gearing and a torque responsive braking means for providing power trains of two different speed ratios between said shafts, said means including a first stationary member constituting an element of said torque responsive braking means and second and third rotatable members all coaxially disposed and so arranged that one of said power trains is completed when said second member is coupled to said first member to be braked thereby and the other power train is completed when said third member is coupled to said first member to be braked thereby, means for so coupling said members together and including axially spaced teeth provided on said second and third members, a pair of shiftable coupling elements coaxial with said members and each having a set of teeth thereon, the teeth of each of said coupling elements being adapted to be disposed between the teeth of said second and third members during a speed change and being adapted to interengage with the teeth of one of the latter members, said coupling elements being spirally splined to said first member whereby the coupling elements are adapted to be moved by the force produced by reversal of torque in said gearing between the first member and either of the second and third members transmitted through said teeth through the reaction of said planetary gearing during torque reversal upon the one of said second and third members which is then coupled with one of said coupling elements, each of said teeth having two opposite faces parallel to the axis of rotation of said second and third members, whereby said coupling elements and said second and third member when coupled together by said teeth may have no relative rotation with respect to each other, said teeth being beveled on their engaging ends, whereby the teeth of said coupling elements may ratchet on the teeth of said second and third members, spring means disposed between said coupling elements yieldably urging said coupling elements apart, said coupling elements being arranged so that one or the other of the sets of teeth on said coupling elements must always be in engaged or in ratcheting position with respect to the teeth adapted to be engaged thereby on said second and third members, means limiting the movement of said coupling elements apart, whereby the teeth of both of said elements cannot be simultaneously in coupling engagement with the teeth of said second and third members, and locking means for selectively preventing the movement of either of said coupling elements out of its position wherein its teeth are interengaged with the teeth of one of said second and third members.

PALMER ORR.

REFERENCES CITED

The following references are of record in the file of this patent:

UNITED STATES PATENTS

| Number | Name | Date |
| --- | --- | --- |
| 1,654,432 | Rowledge | Dec. 27, 1927 |
| 1,862,188 | Legge | June 7, 1932 |
| 1,986,860 | Snow | Jan. 8, 1935 |
| 2,224,322 | Sinclair | Dec. 10, 1940 |
| 2,248,135 | Snow | July 8, 1941 |
| 2,360,711 | Orr | Oct. 17, 1944 |
| 2,371,564 | Wemp | Mar. 13, 1945 |
| 2,403,594 | Gilliard | July 9, 1946 |
| 2,414,388 | Orr et al. | Jan. 14, 1947 |